United States Patent
Huynh et al.

[11] Patent Number: 6,040,668
[45] Date of Patent: Mar. 21, 2000

[54] MONOLITHIC FAN CONTROLLER

[75] Inventors: Quoi V. Huynh, San Jose; Sang T. Ngo, Cupertino, both of Calif.; Joseph James Judkins, III, Cedar Park; Donald E. Alfano, Round Rock, both of Tex.

[73] Assignee: TelCom Semiconductor, Inc., Mountain View, Calif.

[21] Appl. No.: 08/749,864

[22] Filed: Nov. 14, 1996

[51] Int. Cl.[7] ................................................. G05B 5/00
[52] U.S. Cl. ........................ 318/471; 318/461; 318/811; 318/798; 318/473; 318/472; 318/254; 318/138; 318/439; 388/934
[58] Field of Search .................................... 318/471, 461, 318/811, 798, 473, 472, 254, 138, 439; 388/934

[56] References Cited

U.S. PATENT DOCUMENTS

| | | | |
|---|---|---|---|
| 4,659,290 | 4/1987 | Kundert | 417/32 |
| 4,722,669 | 2/1988 | Kundert | 417/32 |
| 5,019,717 | 5/1991 | McCurry et al. | 318/471 X |
| 5,364,026 | 11/1994 | Kundert | 236/49.3 |
| 5,449,143 | 9/1995 | Pecone | 318/434 |
| 5,744,921 | 4/1998 | Makaran | 318/254 |
| 5,806,440 | 9/1998 | Rowlette et al. | 318/481 |
| 5,831,405 | 11/1998 | Massie | 318/471 |

*Primary Examiner*—Karen Masih
*Attorney, Agent, or Firm*—Thomas E. Schatzel; Law Offices of Thomas E. Schatzel, A Prof. Corporation

[57] ABSTRACT

Disclosed herein is a monolithic fan controller circuit which provides the following features: a special start-up routine for the fan; a fan fault detector; a thermal fault detector; an automatic speed controller; a minimum speed controller; a routine for attempting to clear temporary fan faults; and a controllable drive signal frequency. A start-up control circuit provides an initial high duty-cycle kick to the fan in order to initiate the rotation of the fan. A temperature sensor, which may be external or internal to the monolithic fan controller, supplies a signal which is proportional to measured temperature. This signal is used to control the output pulse width of a pulse-width modulator (PWM) or control the frequency of a pulse frequency modulator (PFM). The PWM or PFM output signal regulates the speed of the brushless (or brush) DC fan motor. In a preferred embodiment, the monolithic fan controller has 8 pins.

21 Claims, 5 Drawing Sheets

MONOLITHIC FAN CONTROLLER

FIELD OF THE INVENTION

This invention relates to fan controllers and, in particular, to a fan controller which receives feedback signals to adjust the speed of a fan and to detect a fault.

BACKGROUND

Fan controllers which control the speed of a fan to maintain a relatively constant air temperature are well known and are described in U.S. Pat. Nos. 5,364,026; 4,722,669; and 4,659,290. These representative types of fan controllers employ an ambient air temperature sensor which provides a feedback signal to the fan controller which, in turn, adjusts the speed of the fan motor to maintain the air temperature within a specified range.

Such a fan controller is useful in cabinets which contain electronic equipment since the requirements for cooling vary with ambient air conditions, the particular types of electronic equipment housed within the cabinet, the utilization of the electronic equipment, and other factors which affect the cooling needs within the cabinet. Further, although it is generally adequate to operate the fan at a relatively high constant speed in order to consistently provide cooling for worst case conditions, the constant high speed consumes more energy, reduces the life of the fan, and generates a relatively high noise level.

Sensors for monitoring a fault in fan operation are also known. Such sensors, when detecting a fault, may operate to shut down the electronic equipment within the cabinet in anticipation that the equipment will eventually overheat. One such sensor is described in U.S. Pat. No. 5,448,143 and includes a current sensor that provides a signal indicative of the current through the fan. A pair of comparators detects whether the signal is within a proper range and, if the signal falls out of the range, it is presumed a fan fault has occurred. In response, a system shutdown or warnings occur.

Applicants have identified additional functions for a fan controller which have heretofore not been performed by a fan controller. This present disclosure describes circuitry which performs these functions.

SUMMARY

Disclosed herein is a monolithic fan controller circuit which provides the following features: a special start-up routine for the fan; a fan fault detector; a thermal fault detector; an automatic speed controller; a minimum speed controller; a routine for attempting to clear temporary fan faults; and a controllable drive signal frequency.

A start-up control circuit provides an initial high duty-cycle kick to the fan in order to initiate the rotation of the fan. A current sensing circuit detects fan motor commutation pulses, the frequency of which is a direct measure of fan RPM. These pulses are read by a logic circuit to determine if the fan is not rotating at or above the minimum allowable fan speed. A terminal of the monolithic fan controller is connected to a voltage set by the user for setting the minimum running speed of the fan. Fan operation at lower than minimum speed indicates a faulty fan. Whenever a fault condition is detected, a routine performed by the monolithic fan controller attempts to clear a fan fault a predetermined number of times before asserting a hardware fault signal for shutting down the system. Additional circuitry determines if the fan is at full speed, indicating no reserve fan capacity, and, in response, issues a system or fan fault.

A temperature sensor, which may be external or internal to the monolithic fan controller, supplies a signal which is proportional to measured temperature. This signal is used to control the output pulse width of a pulse-width modulator (PWM) or control the frequency of a pulse frequency modulator (PFM). The PWM or PFM output signal regulates the speed of the brushless (or brush) DC fan motor. The operating frequency of the PWM signal or the frequency range of the PFM signal is adjustable using an external capacitor, or other means, to minimize audible fan noise.

The above features and other features are incorporated into the monolithic fan controller. In a preferred embodiment, the monolithic fan controller has 8 pins.

DETAILED DESCRIPTION OF THE PREFERRED EMBODIMENTS

Figure 1:
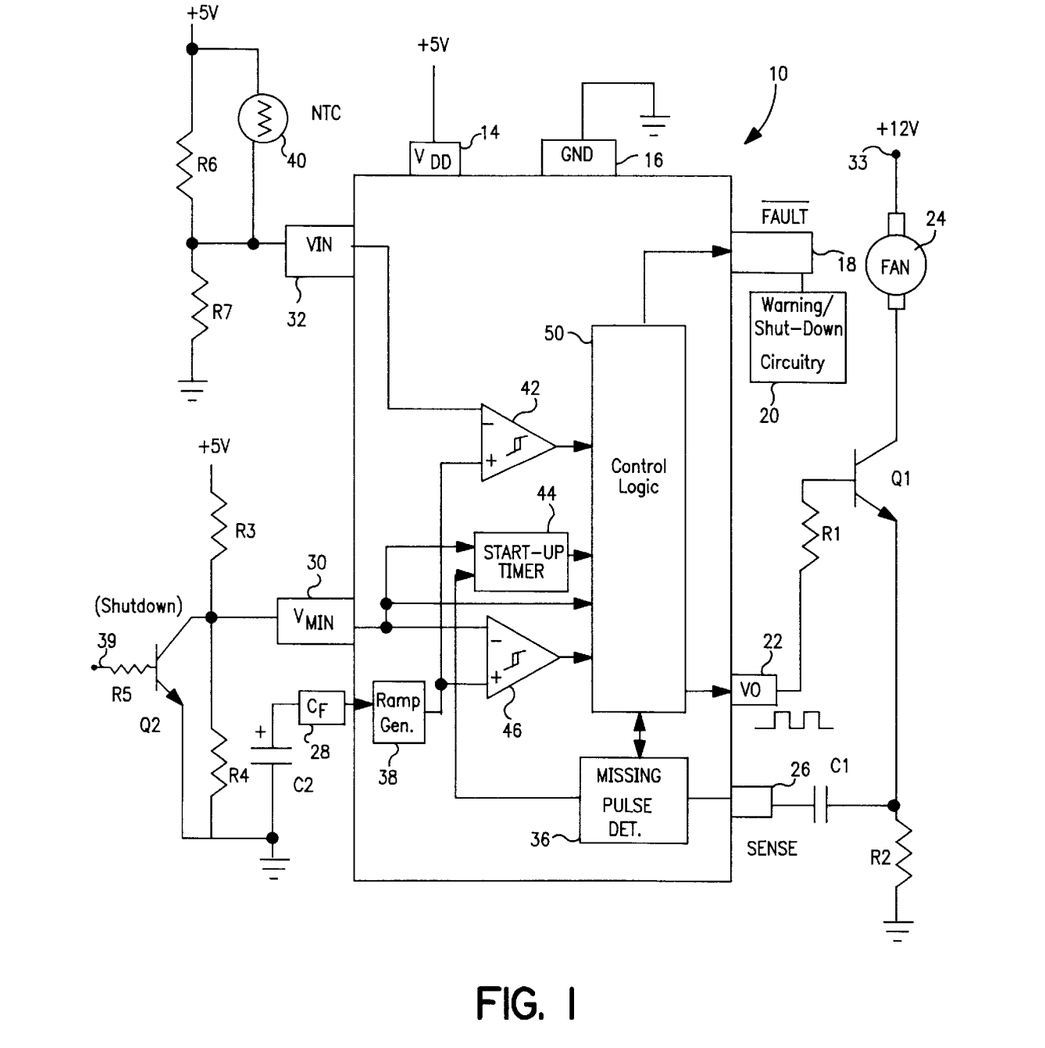
FIG. 1 is a block diagram of the preferred embodiment monolithic fan controller having terminals (or pins) connected to external circuitry in a typical application.

FIG. 1 illustrates the preferred monolithic fan controller 10 formed in a silicon chip. In the preferred embodiment, fan controller 10 is packaged in a standard 8-pin plastic DIP or SOIC package. Fan controller 10 provides a variety of functions which are not available in prior art fan controllers. Fan controller 10 provides at least the following features for a brushless DC fan: 1) a special start-up routine for fan rotation; 2) measurement of fan rotation for the detection of a fan fault; 3) detection of a system thermal fault caused by insufficient fan cooling capacity; 4) fan speed control via pulse width modulation (PWM) or pulse frequency modulation (PFM) in direct proportion to a temperature measured locally or remotely; 5) settable minimum fan speed; 6) a fault clearing routine for attempting to clear temporary fan faults; 7) a controllable drive signal frequency; and 8) a shut-down circuit for shutting the controller down to conserve energy and protect the controller in the case of a catastrophic fan fault.

The identity and function of each of the eight pins extending from the fan controller 10 package is provided below.

$V_{DD}$ pin 14 receives a power supply voltage, such as 5 volts, for powering the circuitry internal to controller 10.

GND terminal 16 is connected to a ground potential.

$\overline{\text{FAULT}}$ terminal 18 provides a signal to external shut-down circuitry or warning circuitry 20 when a fan fault or thermal fault is detected.

$V_O$ pin 22 provides a PWM or PFM signal for driving a fan motor 24 either directly or through an external driver.

SENSE pin 26 receives a pulse feedback signal relating to the speed of the fan motor 24.

$C_F$ pin 28 is coupled to a capacitor which sets the PWM (or PFM) frequency.

$V_{MIN}$ pin 30 receives a DC signal which sets the minimum fan speed, or receives a DC signal to shut down the device.

$V_{IN}$ pin 32 receives a signal related to temperature for variably controlling the fan speed to maintain a relatively constant temperature.

The external circuitry coupled to the eight pins of controller 10 will now be described.

The $V_O$ pin 22 provides a PWM or PFM pulse train through resistor R1 and to the base of transistor Q1 for turning transistor Q1 on and off at the duty cycle of the pulse train. A brushless DC fan motor 24 has one terminal coupled to a positive power supply terminal 33, such as a +12 volt terminal, and its other terminal coupled to the collector of transistor Q1. The emitter of transistor Q1 is coupled to ground through a low value resistor R2. In one embodiment, resistor R2 is 0.3 ohms to 2.5 ohms, depending on the size of the fan. The value chosen for R2 is, preferably, inversely proportional to the nominal fan current. The pulsed current through fan motor 24 causes the fan speed to be proportional to the duty cycle of the pulse train output at the $V_O$ pin 22.

The upper terminal of resistor R2 is coupled via a capacitor C1 to the SENSE pin 26. The capacitor C1 filters out the DC and low frequency signals at the upper terminal of resistor R2. During normal fan operation, commutation occurs as each pole of the fan is energized in sequence. This causes brief interruptions in the fan current, seen as pulses across the sense resistor R2. To avoid misinterpreting the turn-on pulse of transistor Q1 as a valid fan pulse, a missing pulse detector 36, to be described in greater detail later, blanks out the first pulse on SENSE pin 26 happening when transistor Q1 is turned on by the $V_O$ signal.

A capacitor C2 is connected between the $C_F$ pin 28 and ground to control the oscillation frequency of a ramp generator 38, which may be a conventional ramp generator whose frequency is related to a capacitance. The frequency of generator 38 may, therefore, be adjusted to avoid any interference or resonance with other circuitry or structures. In the preferred embodiment, a frequency of 30 Hz is recommended, corresponding to a capacitance of 1 uF.

A voltage divider, formed of resistors R3 and R4, is connected to the $V_{MIN}$ pin 30, which sets the minimum duty cycle of the PWM signal at $V_O$ pin 22. The desired minimum duty cycle may be determined empirically and sets the minimum RPM of the fan motor 24. An optional shutdown circuit, consisting of a transistor Q2 receiving a shutdown signal 39 via a resistor R5, may be connected between the $V_{MIN}$ pin 30 and ground, wherein shunting the $V_{MIN}$ pin 30 to ground causes the duty cycle of the PWM signal to be zero and shuts down the device.

A voltage relating to the temperature to be controlled is applied to the $V_{IN}$ pin 32. There are numerous circuits to provide such a temperature related voltage. FIG. 1 illustrates the use of a temperature sensor 40 (e.g., a thermistor) having a negative temperature coefficient connected in parallel with one resistor R6 of a voltage divider, consisting of resistors R6 and R7. As the temperature increases, the resistance of the temperature sensor 40 goes down, raising the voltage at the $V_{IN}$ pin 32. Other temperature sensors having a positive temperature coefficient may also be used in a circuit which raises the voltage at the $V_{IN}$ pin 32 with an increase in temperature. In the preferred embodiment, the temperature sensing network provides a voltage between 1.2 volts (initial temperature=0% duty cycle) and 2.6 volts (maximum tolerable temperature=100% duty cycle).

The operation of the fan controller 10 will now be described with respect to the flow chart of FIG. 2. It is assumed that the circuitry identified in FIG. 1 is incorporated in a cabinet for electronic equipment, such as a computer.

In step 1, the user turns on the personal computer using an external switch. This applies power to the $V_{DD}$ pin 14 to start the fan control process.

Typically, at this time, the temperature within the cabinet is relatively low, thus supplying a low initial voltage at the $V_{IN}$ pin 32. This initial voltage is shown as $V_{IN}$ (start) in FIG. 3 and is typically less than $V_{MIN}$, causing the fan motor 24 to run at a speed determined by $V_{MIN}$.

Figure 3:
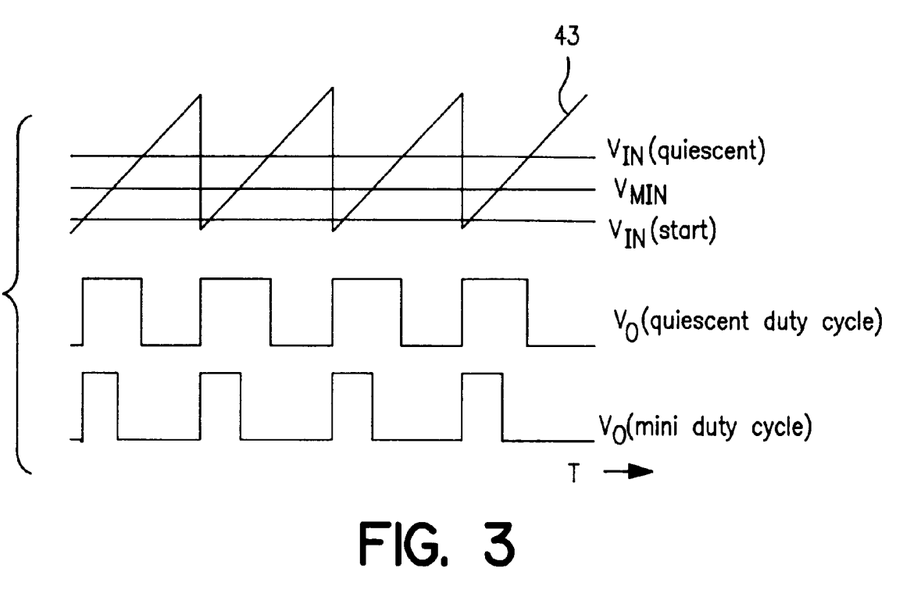
FIG. 3 depicts an example of the ramp generator signal, the temperature-related input voltage, the minimum fan speed voltage, and the PWM drive signal for the fan motor.

The voltage at the $V_{IN}$ pin 32 is coupled to an input of a comparator 42. A second input of comparator 42 is connected to the output of the ramp generator 38, which generates a sawtooth pattern 43 (FIG. 3) having a frequency set by the value of capacitor C2. This frequency is assumed to be approximately 30 Hz. Once $V_{IN}$ exceeds $V_{MIN}$, the width of each pulse in the pulse train output on the $V_O$ pin 22 is approximately equal to the time that the sawtooth pattern 43 is below the $V_{IN}$ voltage, as shown in FIG. 3. If $V_{IN}$ is below $V_{MIN}$, the duty cycle of the PWM signal will be determined by the $V_{MIN}$ voltage, as shown in FIG. 3. Thus, as the temperature increases, causing $V_{IN}$ to increase above $V_{MIN}$, the duty cycle of the signal at the $V_O$ pin 22 will also increase with $V_{IN}$ up to a 100% output duty cycle.

Figure 2:
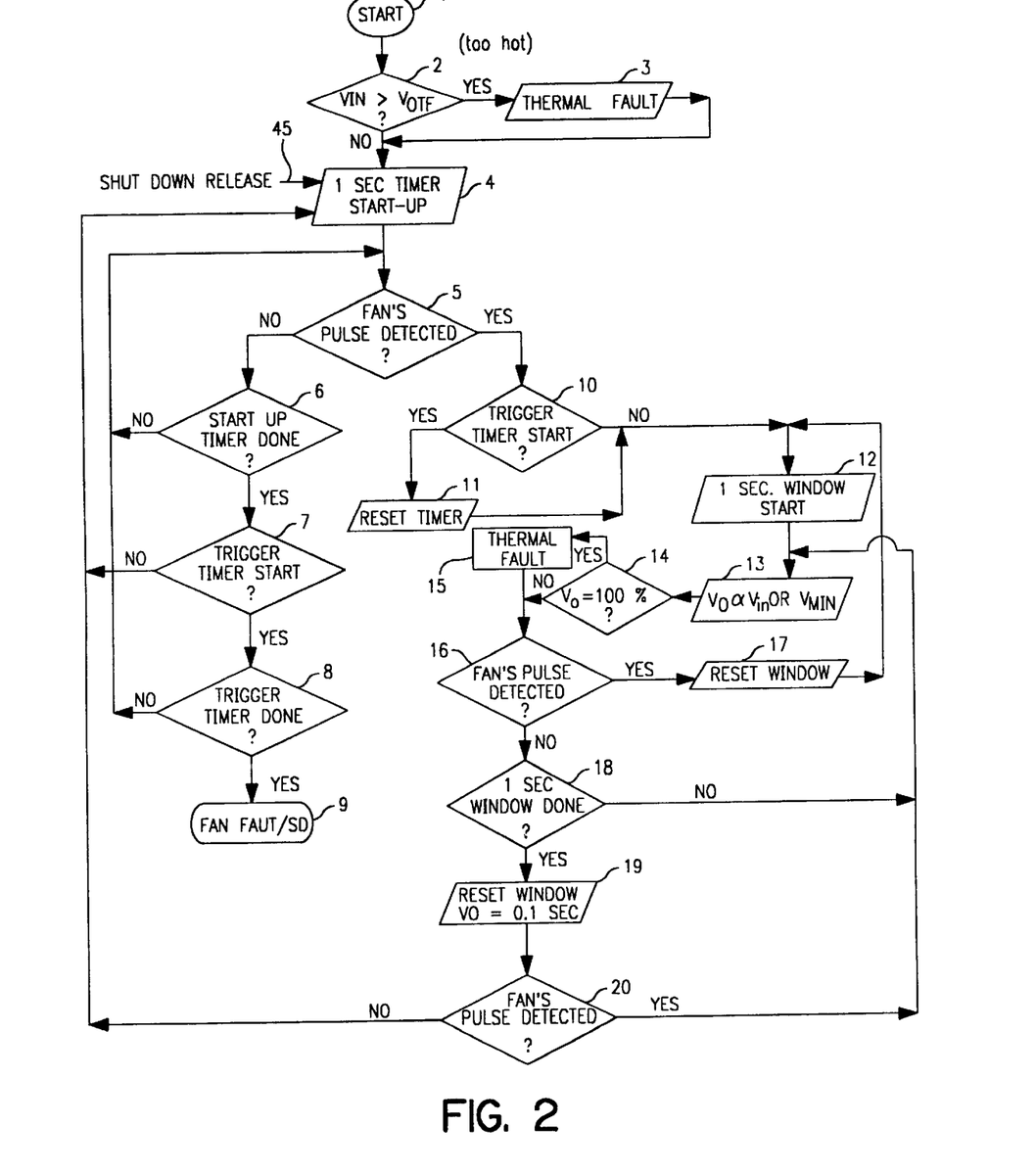
FIG. 2 is a flow diagram of a preferred start-up and operating routine performed by the fan controller of FIG. 1.

During step 2 of FIG. 2, if, at the time the fan controller 10 is turned on, $V_{IN}$ is higher than a designed threshold $V_{OTF}$, then it is determined that even a 100% duty cycle of the PWM stream will not cause the fan motor 24 to adequately cool the circuitry internal to the cabinet. The temperature at which $V_{IN}$ becomes greater than $V_{OTF}$ is set by the user in the design of the temperature sensing circuitry and is empirically determined.

As shown in step 2, if $V_{IN}$ is greater than the thermal fault threshold voltage $V_{OTF}$, a thermal fault signal is asserted (step 3). This provides a signal on $\overline{\text{FAULT}}$ pin 18, signalling to external warning/shut-down circuitry 20 to initiate a warning signal for a "too hot" temperature condition. Assuming that the warning/shut-down circuitry 20 still allows operation of the fan controller 10 and equipment internal to the cabinet, the operation of the fan controller 10 proceeds to step 4. If there was no thermal fault detected, step 4 would be the next step after step 2.

In step 4, the $V_O$ pin 22 is forced to output a duty cycle of 100% (i.e., a DC signal) for 32 cycles of the ramp generator 38 waveform. At a ramp generator frequency of 30 Hz, this equates to a high-level DC signal at the $V_O$ pin 22 for about 1 second. A start-up timer 44 (e.g., a counter) in FIG. 1 performs this timing. This is intended to provide a high duty cycle signal to fan motor 24 to essentially jar fan motor 24 from a static, high friction position. This also provides a predictable time period within which fan motor 24 should be rotating normally. Without this start-up timer 44, the time that the fan motor 24 begins rotating is relatively unpredictable. Other time periods may be used, such as 0.1 to 3 seconds.

If external shutdown circuitry is used, shown in FIG. 1 as transistor Q2 and resistor R5, the $V_{MIN}$ pin 30 may be driven low to completely block the start-up timer 44 from initiating the start-up sequence. Hence, in step 4, it is also detected whether the $V_{MIN}$ pin 30 is above a shutdown threshold. Assuming the shutdown release signal on line 45 is asserted, the sequence proceeds to step 5.

During the start-up sequence, the missing pulse detector 36 senses pulses on SENSE pin 26 to determine if the rotor of the fan motor 24 is spinning. As previously mentioned, the spinning of the fan rotor will cause brief interruptions in the fan current through the low value resistor R2.

If the pulses are not detected, it is determined in step 6 whether the one second start-up period has concluded. If not, the sensing of pulses is continued. Once it is determined in step 6 that the one second start-up period has elapsed, the process proceeds to step 7, which repeats the start-up sequence one more time.

If, pursuant to this second start-up sequence, pulses at the SENSE pin 26 are still not detected, and the second start-up timer has elapsed, as determined in step 8, the process commences to step 9, which asserts a fault signal on $\overline{FAULT}$ pin 18 and completely shuts down the circuitry intended to be cooled by fan motor 24.

Assuming in step 5 that pulses were detected by the missing pulse detector 36, the process proceeds to step 10, which simply determines whether the one second start-up period has elapsed. If the start-up period has not elapsed, then the start-up timer 44 is reset in step 11, and the process proceeds to step 12. If it is determined in step 10 that the start-up timer 44 has already completed its one second period, the process directly proceeds to step 12.

For the remaining steps, the missing pulse detector 36 looks for consecutive fan pulses within any one second window (i.e., within 32 oscillations of the ramp generator 38) and, if such pulses are detected, the control logic 50 assumes that there is no fan fault. The one second window is started in step 12. Other windows may be used such as 0.1 to 3 seconds. The duty cycle of the PWM signal at the $V_O$ pin 22 is now determined by the output of comparator 42 or by the output of comparator 46, whichever provides the highest duty cycle. The $V_{IN}$ pin 32 and ramp generator 38 are coupled to comparator 42, while the $V_{MIN}$ pin 30 and ramp generator 38 are coupled to comparator 46. The output of comparator 46 provides a minimum duty cycle of the output signal on the $V_O$ pin 22. Hence, the fan motor 24 will typically be running at this minimum speed until the temperature inside the cabinet causes $V_{IN}$ to be greater than $V_{MIN}$, thus increasing the fan RPM to maintain the temperature within a certain range. The adjustment of the duty cycle of the $V_O$ signal in response to the $V_{IN}$ and $V_{MIN}$ signals is indicated in step 13.

A thermal fault is asserted if the PWM signal reaches 100% duty cycle (steps 14 and 15) and $V_{IN}$ is still larger than $V_{OTF}$, indicating a possible thermal runaway situation. In this over-temperature fault mode, the device still generates a 100% duty-cycle for the PWM signal at $V_O$ pin 22 without shutting itself down.

Assuming a thermal fault is asserted on $\overline{FAULT}$ pin 18 and assuming that the warning/shut-down circuitry 20 still allows operation of the fan controller 10, the process directly proceeds to step 16. The process would also proceed to step 16 if the $V_O$ duty cycle detected in step 14 was under 100%.

If consecutive fan pulses are detected within the one second window, as illustrated in step 16, the one second window is reset in step 17, and this loop continues throughout the time that the electronic circuitry internal to the cabinet is energized.

If it is detected that there were no consecutive fan pulses at the SENSE pin 26 within the one second window, and the one second window has expired, as shown in step 18, it is determined that the fan motor 24 might be running at too low of a speed or has actually stopped. In response, a 100% duty cycle signal is then output on the $V_O$ pin 22 for 3 cycles of the ramp generator, or for about 0.1 second at 30 Hz, to attempt to speed up the fan motor or to jar the fan motor 24 from a stuck state, as shown in step 19.

If a fan pulse is not detected within this 0.1 second window, as shown in step 20, the start-up routine is again initiated in step 4. If a fan pulse is detected within the 0.1 second window, normal operation commences at the start of step 13.

As would be understood by those skilled in the art, the control logic 50 and other circuitry contain simple logic elements for carrying out the process of FIG. 2. The decision steps in FIG. 2 are implemented using simple logic gates forming a truth table or a state machine. There are numerous equivalent circuits which may be used to perform the logic functions of FIG. 2. One skilled in the art could readily design such circuitry either manually or by using a suitable logic design software program. Alternatively, the process of FIG. 2 may be carried out with circuitry comprising a microcontroller running appropriate software routines.

Figure 4A:
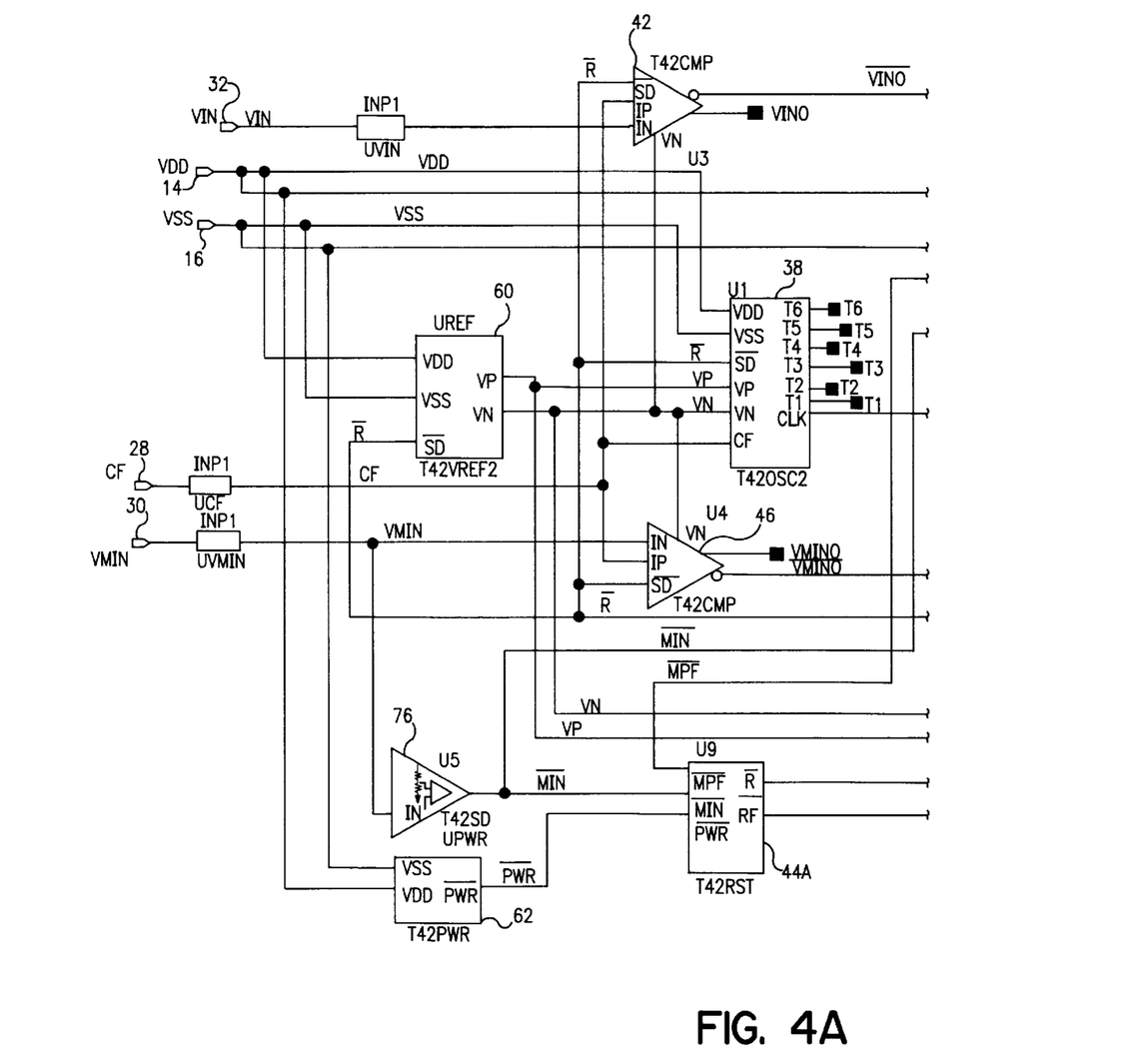
FIG. 4 is a more detailed diagram of the fan controller of FIG. 1.
Figure 4B:
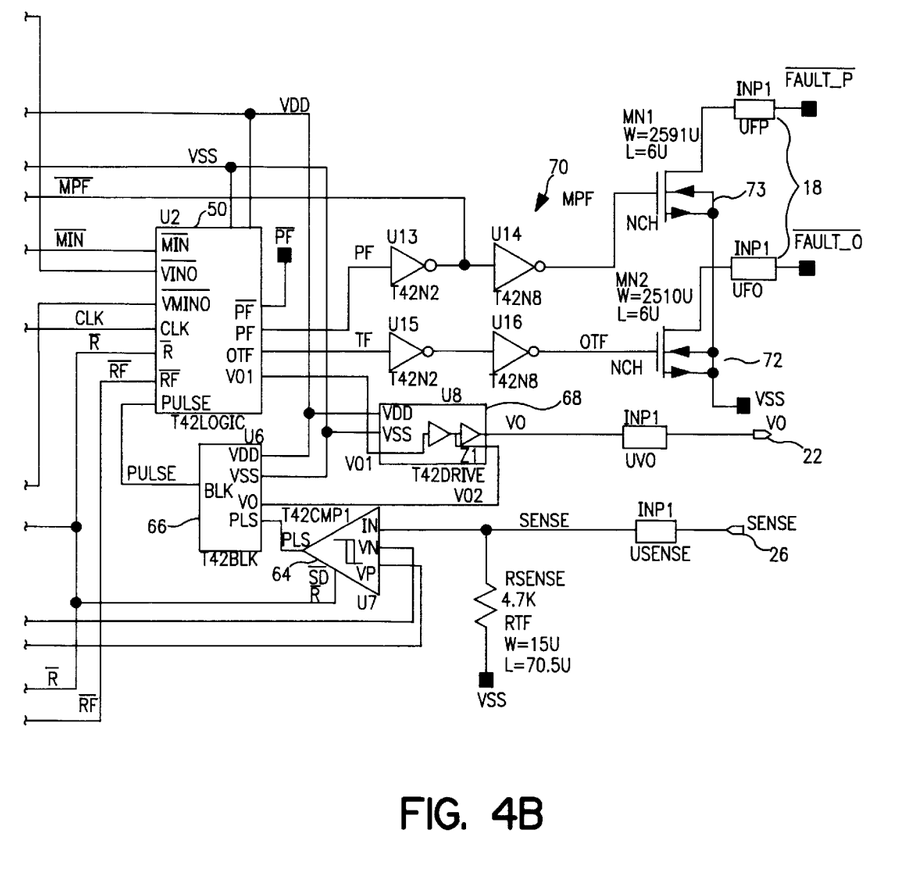

A more detailed block diagram of the fan controller 10 is illustrated in FIG. 4. Elements identified with the same numerals as in FIG. 1 may be identical. The entire circuit of FIG. 4 is preferably formed as a monolithic structure.

Comparators 42 and 46 are shown as hysteresis type comparators, which are well known. Such comparators use an upper and lower threshold to trigger the comparator, depending upon the current output state of the comparator. This avoids oscillations in the outputs of comparators 42 and 46. Logic circuitry as mentioned above provides the shut-down signal ($\overline{SD}$) for the comparators 42 and 46 as well as for other circuits in the shutdown mode of operation.

A power detector 62 detects the application of power to the terminals of the fan controller 10 and issues a reset signal to a reset circuit 44A for the start-up timer 44. The 5-bit counter forming a portion of the start-up timer is located in control logic 50. The ramp voltage generator 38 outputs a ramped CF signal to the inputs of comparators 42 and 46 and a non-ramped clock signal to the control logic 50 for timing.

The SENSE input on pin 26 is applied to the input of a hysteresis type comparator 64, which then outputs a pulse when the SENSE pulse falls below a certain lower threshold then rises above a certain threshold to indicate that the fan rotor is turning. Comparator 64 thus senses the magnitude of the current as well as the existence of pulses for use in determining an abnormal fan current or an abnormal fan rotation. The output of comparator 64 is applied to a blanking circuit 66 which blanks out the pulse which occurs due to the switching on of the fan drive transistor Q1 in FIG. 1. The blanking circuit 66 receives an enable signal from the buffer driver 68 which corresponds to the signal $V_O$ applied to the base of the driver transistor Q1, so that the blanking circuit 66 only activates when the $V_O$ signal level is high (e.g., 5V). Comparator 64 and blanking circuit 66 are part of the missing pulse detector 36 in FIG. 1. An output of the blanking circuit 66 into the control logic 50 is used to measure the fan motor rotation for the detection of a fan fault.

A comparator 76 senses whether the $V_{MIN}$ pin 30 is below an internally set threshold voltage, signalling an externally controlled shutdown mode.

A thermal fault signal (OTF) is output by control logic 50 for an over-temperature fault, and a fan fault signal (PF) is output for a fan fault. These fault signals are buffered by inverters 70 and applied to opened-drain N-channel driver transistors 72 and 73, respectively. The drains of the two N-channel transistors 72, 73 are coupled together by being bonded to the same $\overline{FAULT}$ pin 18.

When the fan fault condition is activated, the controller 10 is latched in a shutdown mode and will remain off indefinitely. The fan controller 10 is thus prevented from attempting to drive the fan under catastrophic fault conditions. One of two things will restore operation: cycling power off and then on again, or pulling the $V_{MIN}$ pin 30 below the shutdown threshold voltage and then releasing it to a larger specified voltage. When one of these two conditions is satisfied, the normal start-up cycle is triggered.

When an over-temperature fault is asserted, indicating that the PWM signal is at a maximum duty cycle and the potential exists for system overheating, the fan will continue to run even when the fault is asserted. Such a thermal fault may be detected by the output of comparator 42 comparing $V_{IN}$ with the maximum level of the ramp generator 38 voltage ($V_{OTF}$). This over-temperature fault is cleared by one of the two above procedures, which is also used to clear a fan fault, or by cooling off the ambient temperature so that $V_{IN}$ becomes smaller than $V_{OTF}$. The fault output may be treated as a system overheat warning or used to trigger a system shutdown.

In view of the detail provided in FIG. 4, one skilled in the art could readily implement the preferred embodiment of the invention.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A monolithic fan controller comprising:
    a driver circuit for providing a pulse train for driving a fan motor, varying said pulse train controlling a speed of said fan motor;
    a thermal sense circuit for receiving a signal relating to a temperature and, in response thereto, for varying said pulse train; and
    a fan rotation sense circuit for detecting pulses created by fan motor rotation and for generating a signal indicating non-rotation of said fan motor in response to an absence of said detecting pulses.

2. The controller of claim 1 further comprising a start-up circuit for causing said pulse train to have a 100% duty cycle for only a predetermined period of time.

3. The controller of claim 1 wherein said fan rotation sense circuit includes a terminal which receives pulses caused by interruptions in current to said fan motor as said fan motor rotates, said fan rotation sense circuit also including a fan pulse detection circuit for detecting an insufficient number of said pulses created by said fan motor rotation over a predetermined period of time, and, in response to such detection of said insufficient number of pulses, issuing a fault signal.

4. The controller of claim 1 further comprising a minimum fan speed circuit for detecting a first voltage at a terminal of said monolithic fan controller and causing said fan motor to run at a speed no lower than a minimum speed set by said first voltage.

5. The controller of claim 4 further comprising a fan speed detection circuit for detecting that said fan motor is operating below said minimum speed and, in response, for issuing a fault signal.

6. The controller of claim 1 further comprising a thermal-runaway detection circuit for detecting that said pulse train is providing a maximum fan speed signal to said fan motor and, in response, triggering a fault signal.

7. The controller of claim 1 further comprising a fault clearing circuit for detecting a fault in said fan motor and for attempting to clear said fault one or more times by setting said pulse train to a maximum fan speed pulse train prior to asserting a fault signal at a terminal of said fan controller.

8. The controller of claim 1 wherein said pulse train is a pulse width modulated signal, and varying said pulse train comprises varying a duty cycle of said pulse train.

9. The controller of claim 8 wherein an operating frequency of said pulse width modulated signal is set using an external capacitor connected to a terminal of said monolithic fan controller.

10. The controller of claim 1 wherein said pulse train is a pulse frequency modulated signal, and varying said pulse train comprises varying a frequency of said pulse train.

11. The controller of claim 10 wherein a range of frequencies of said pulse frequency modulated signal is set using an external capacitor connected to a terminal of said monolithic fan controller.

12. The fan controller of claim 1 wherein a package housing said monolithic fan controller includes eight terminals, said terminals comprising:
    a supply voltage terminal for receiving a supply voltage;
    a reference terminal for receiving a reference potential;
    a fault terminal for providing a fault signal;
    a pulse train output terminal for providing a pulse train for driving a fan motor;
    a sense terminal for receiving a pulse feedback signal relating to a speed of said fan motor;
    a frequency control terminal for connection to a capacitor for controlling a frequency of said pulse train;
    a minimum fan speed terminal for receiving a signal for setting a minimum fan speed; and
    a thermal sense terminal for receiving a signal related to temperature for variably controlling said speed of the fan motor.

13. The controller of claim 1 further comprising a terminal for receiving a voltage for setting a minimum fan speed, said terminal being connected to a shut-down circuit external to said monolithic fan controller for selectively shutting down said fan controller.

14. The controller of claim 1 further comprising a fault clearing circuit for detecting a fault in said fan motor, for issuing a maximum fan speed pulse train signal for a predetermined period of time, and for repeating said step of issuing if it is determined that said fan motor is not operating correctly.

15. A method performed by a monolithic fan controller comprising the steps of:
    initiating a start-up routine for rotating a fan motor;
    temporarily issuing a maximum pulse train signal for driving said fan motor;
    detecting the existence of pulses relating to rotation of said fan motor for determining whether said fan motor is rotating in a desired manner;
    issuing a fault signal if it is detected that said fan motor is not rotating in said desired manner; and
    issuing a pulse train signal, below said maximum pulse train signal, for driving said fan motor at a speed for maintaining a desired temperature, if it is detected that said fan motor is rotating in said desired manner.

16. The method of claim 15 wherein said issuing said fault signal occurs after repeating said step of temporarily issuing a maximum pulse train signal a predetermined number of cycles.

17. The method of claim 15 further comprising the steps of:
    sensing a voltage related to a temperature;
    comparing said voltage relating to a temperature with a threshold voltage; and
    issuing a fault signal if said temperature related voltage is greater than said threshold voltage.

18. The method of claim 15 wherein said step of temporarily issuing a maximum pulse train signal for driving said fan motor comprises the step of providing a high duty cycle signal to said fan motor for about 0.1 to 3 seconds.

19. The method of claim 15 wherein said step of detecting the existence of pulses comprises the step of detecting the existence of pulses within a predetermined time window to determine whether said pulses meet a criteria for said fan motor rotating in a desired manner.

20. The method of claim 19 wherein said time window is within the range of about 0.1 to 3 seconds.

21. The method of claim 15 wherein said step of temporarily issuing a maximum pulse train signal for driving said fan motor is repeated one or more times before issuing said fault signal if it is detected that said fan motor is not rotating in said desired manner.

* * * * *